US008077802B2

(12) United States Patent
Sandhu et al.

(10) Patent No.: US 8,077,802 B2
(45) Date of Patent: Dec. 13, 2011

(54) DEVICE, SYSTEM, AND METHOD OF RESOURCE ALLOCATION IN A WIRELESS NETWORK

(75) Inventors: Sumeet Sandhu, Santa Clara, CA (US); Feng Xue, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 12/049,766

(22) Filed: Mar. 17, 2008

(65) Prior Publication Data

US 2009/0232229 A1 Sep. 17, 2009

(51) Int. Cl.
- H04L 27/04 (2006.01)
- H04L 23/00 (2006.01)
- H04B 1/00 (2006.01)
- H04W 72/04 (2009.01)
- H04J 3/16 (2006.01)

(52) U.S. Cl. ..... 375/299; 375/377; 455/101; 455/452.1; 370/437

(58) Field of Classification Search .................. 375/219, 375/259–260, 267, 299, 377; 370/57, 203–204, 370/208, 277, 281, 295, 302, 330, 343–344, 370/436, 478, 480–481, 437; 455/33.1, 33.3, 455/422.1, 101, 450, 451, 452.1, 452.2
See application file for complete search history.

(56) References Cited

U.S. PATENT DOCUMENTS

| | | | | |
|---|---|---|---|---|
| 7,567,621 | B2 * | 7/2009 | Sampath et al. | 375/267 |
| 7,756,519 | B2 * | 7/2010 | Barak et al. | 455/447 |
| 7,778,147 | B2 * | 8/2010 | Forenza et al. | 370/204 |
| 2004/0166869 | A1 * | 8/2004 | Laroia et al. | 455/450 |
| 2005/0094675 | A1 * | 5/2005 | Bhushan et al. | 370/527 |
| 2005/0113120 | A1 * | 5/2005 | Rappaport et al. | 455/500 |
| 2005/0169388 | A1 * | 8/2005 | Toland et al. | 375/259 |
| 2006/0083195 | A1 * | 4/2006 | Forenza et al. | 370/328 |
| 2006/0133521 | A1 * | 6/2006 | Sampath et al. | 375/260 |
| 2007/0081507 | A1 * | 4/2007 | Koo et al. | 370/338 |
| 2007/0189151 | A1 * | 8/2007 | Pan et al. | 370/210 |
| 2007/0211815 | A1 * | 9/2007 | Pan et al. | 375/267 |
| 2007/0230406 | A1 * | 10/2007 | Kim et al. | 370/335 |
| 2007/0270170 | A1 * | 11/2007 | Yoon et al. | 455/509 |
| 2008/0009321 | A1 * | 1/2008 | Sayeed et al. | 455/562.1 |
| 2009/0274074 | A1 * | 11/2009 | Astely | 370/280 |

(Continued)

OTHER PUBLICATIONS

Goud Jr. et al., Multiple-Antenna Communication Systems: An Emerging Technology, 2004, Electrical and Computer Engineering, Canadian Journal of, vol. 29, Issue 1, pp. 51-59.*

(Continued)

Primary Examiner — Tesfaldet Bocure
Assistant Examiner — Lawrence Williams
(74) Attorney, Agent, or Firm — Shiloh et al.

(57) ABSTRACT

Device, system, and method of resource allocation in a wireless network. Embodiments include optimal space-frequency architectures for very high peak rates in wireless systems. For example, an apparatus for wireless communication in a power-limited, very wideband system includes a wireless communication device having a media access controller (MAC) and a physical layer (PHY) that are adapted for a multiple-input-multiple-output (MIMO) orthogonal frequency-division multiple access (OFDMA) communication scheme; a plurality of antennas, operationally coupled to said device, to send and receive wireless communication signals according to the MIMO-OFDMA communication scheme; and a resource allocator, to allocate transmission resources of the device into desired MIMO channels optimized according to at least one of signal-to-noise ratio (SNR), bandwidth, number of users, and signal-to-noise-plus-interference ratio (SINR).

19 Claims, 6 Drawing Sheets

U.S. PATENT DOCUMENTS

2010/0110878 A1* 5/2010 Frederiksen et al. .......... 370/216
2010/0188966 A1* 7/2010 Pun et al. ...................... 370/203

OTHER PUBLICATIONS

Gesbert et al., Outdoor MIMO Wireless Channels: Models and Performance Prediction, Dec. 2002, IEEE Transactions on Communications, vol. 50, No. 12, pp. 1926-1934.*

Wei et al., Performance of Spatial Division Multiplexing MIMO With Frequency Domain Packet Scheduling: From Theory To Practice, 2008, Selected Areas in Communications, IEEE Journal on, vol. 26, Issue 6, pp. 890-900.*

Goud Jr., Multiple-Antenna Communication Systems: An Emerging Technology, Jan./Apr. 2004, Canadian Journal of Computer Engineering, vol. 29, No. 1/2, pp. 51-59.*

Geshart et al., Outdoor MIMO Wireless Channels: Models and Performance Prediction, Dec. 2002, Communication, IEEE Transactions on, vol. 50, Issue: 12, pp. 1926-1934.*

Babich et al., Performance Evaluation of Distributed Wireless Networks Using Smart Antennas in Low-Rank Channel, 2007, Communications, IEEE Transactions on, vol. 55, Issue 7, pp. 1344-1353.*

Wei, et al., Performance of Spatial Division Multiplexing MIMO with Frequency Domain Packet Scheduling: From Theory to Practice, Aug. 2008, IEEE Journal on Selected Areas in Communications, vol. 26, No. 6, pp. 890-900.*

Etkin et al., "Gaussian Interference Channel Capacity to Within One Bit", Feb. 8, 2007, pp. 1-52.

Darwin Enger, "Gigabit Nomadic Wireless", Interop Las Vegas May 22, 2007, pp. 1-14.

* cited by examiner

DEVICE, SYSTEM, AND METHOD OF RESOURCE ALLOCATION IN A WIRELESS NETWORK

BACKGROUND

Some wireless communication systems allow users of mobile devices to participate in voice conversations and video conferences, to send and receive data and media files, to send and receive Short Message Service (SMS) messages, or the like. Some users may require broadband communications, for example, in order to rapidly send and receive large files or in order to experience high-quality video playback.

The per-user communication demand for broadband data is increasing due to a combination of factors including, for example, growing size of raw data content (e.g., proliferation of video traffic), more data being generated due to faster computation capabilities, and increased connectivity that encourages sharing data with more users.

To support the growing communication demand for ever-higher data rates requires ever-wider portions of Radio Frequency spectrum per user. However, spectrum is a precious resource, and is often strictly regulated or difficult to find. Therefore it is important to provide spectrally efficient techniques that can maximize the data rates and number of users per unit of spectrum.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that embodiments may be practiced without these specific details. In other instances, well-known methods, procedures, components, units and/or circuits have not been described in detail so as not to obscure the discussion.

Some embodiments may be used in conjunction with various devices and systems, for example, a transmitter, a receiver, a transceiver, a transmitter-receiver, a wireless communication station, a wireless communication device, a wireless access point (AP), a modem, a wireless modem, a personal computer, a desktop computer, a mobile computer, a laptop computer, a notebook computer, a tablet computer, a handheld computer, a server computer, a personal digital assistant (PDA) device, a handheld PDA device, a network, a wireless network, a local area network (LAN), a wireless LAN (WLAN), a metropolitan area network (MAN), a wireless MAN (WMAN), wide area network (WAN), wireless WAN (WWAN), a personal area network (PAN), a wireless PAN (WPAN), devices and/or networks operating in accordance with existing Institute of Electrical and Electronics Engineers (IEEE) standards such as IEEE 802.11, 802.11a, 802.11b, 802.11g, 802.11n, 802.16, 802.16d, 802.16e, and other derivatives, long-term evolution (LTE) standards and/or future versions of the above standards, units and/or devices which are part of the above networks, one way and/or two-way radio communication systems, cellular radio-telephone communication systems, a cellular telephone, a cellular smartphone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates a radio frequency identification element or chip, a multiple input multiple output (MIMO) transceiver or device, a single input multiple output (SIMO) transceiver or device, a multiple input single output (MISO) transceiver or device, a multi receiver chain (MRC) transceiver or device, a transceiver or device having "smart antenna" technology or multiple antenna technology, a device having one or more internal antennas and/or external antennas, a wired or wireless handheld device, a wireless application protocol (WAP) device, or the like.

In some embodiments, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. Some embodiments of the invention may be used in conjunction with one or more types of wireless communication signals and/or systems, for example, radio frequency (RF), infra red (IR), frequency-division multiplexing (FDM), orthogonal FDM (OFDM), orthogonal frequency-division multiple access (OFDMA), S-OFDMA, time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, global positioning system (GPS), WiFi, WiMax, ZigBee™, ultra-wideband (UWB), 60 GHz (mmWave) communication, TeraHertz communication, lightwave communication, very wideband communication at any carrier frequency, global system for mobile communication (GSM), 2 G, 2.5 G, 3 G, 3.5 G, 4 G or the like. Embodiments of the invention may be used in various other devices, systems and/or networks.

Discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. In addition, the terms "plurality" and "a plurality" as used herein include, for example, "multiple" or "two or more". The terms "plurality" or "a plurality" may be used throughout the specification to describe two or more components, devices, elements, units, parameters, or the like.

The term "very wideband" as used herein includes, for example, communication at rates significantly higher than those of conventional "wideband" wireless systems, e.g., communication at rates of 100 MHz or above. In comparison, conventional wireless wideband data standards, e.g., as implemented in 802.16 WiMAX and similar systems, typically have a bandwidth capacity of 20 MHz or 40 MHz at most. Similarly, the term "very high throughput" as used herein includes, for example, throughput of 1 Gbps or above. As used herein, the terms "very wideband" and "very high throughput" may also include ranges associated with the terms "wideband" and "high throughput", respectively, but are not bound by these ranges.

Figure 1:
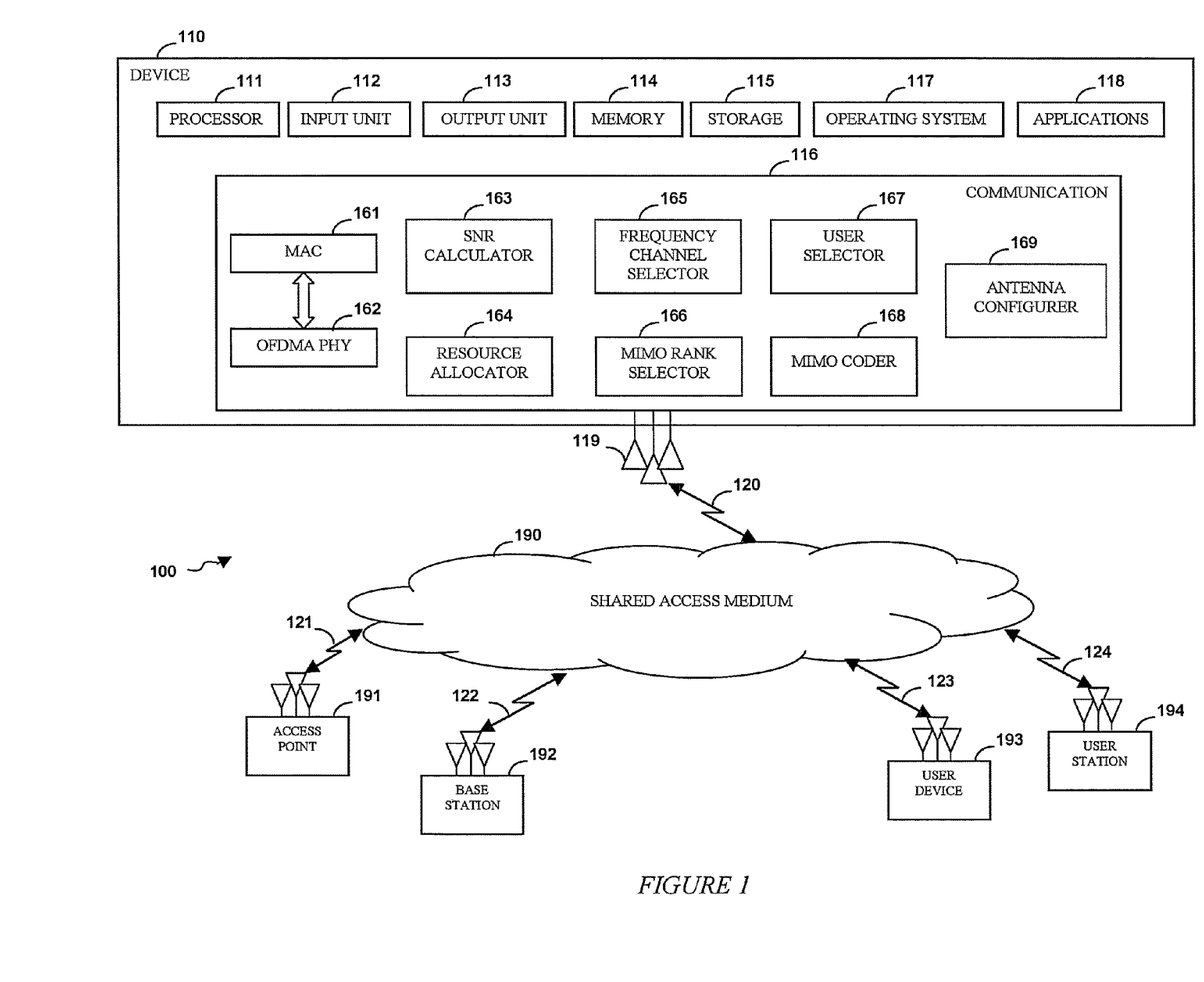
FIG. 1 is a schematic block diagram illustration of a wireless communication system in accordance with a demonstrative embodiment of the invention.

FIG. 1 schematically illustrates a wireless communication system 100 in accordance with some demonstrative embodiments of the invention. System 100 may be or may include one or more wireless communication networks, for example, an asynchronous wireless network, a synchronic wireless network, a burstable wireless network, a non-burstable wireless network, a hybrid network, a combination of one or more networks, or the like. System 100 may include, for example, a wireless communication device 110 able to communicate using a shared access medium 190 with one or more other devices such as a wireless access point (AP) 191, a wireless base station 192, a wireless communication device 193, a wireless communication station 194, and the like.

For example, wireless devices 110, 191, 192, 193, and 194 may communicate via wireless links 120-124, respectively. Links 120-124 may each include an uplink and a downlink, each including one or more channels, sub-channels, and/or sub-carriers, to carry wireless communication signals to and from the wireless devices. In some embodiments, system 100 may be a very wideband system such that, for example, one or more of wireless links 120-124 may be configured to support very high throughput wireless communication, e.g., a throughput of 1 Gbps, as detailed below. Some embodiments may utilize standards and/or protocols of the Institute of Electrical and Electronics Engineers (IEEE) Very High Throughput Wireless LAN Study Group and Task Groups in the future, for example Task Groups for the 5 GHz band and the 60 GHz band. Some embodiments may also utilize standards and/or protocols of the Institute of Electrical and Electronics Engineers (IEEE) Study Groups and Task Groups on wireless Personal Area Networks, and/or the Wireless USB consortium.

Device 110 may be or may include, for example, a mobile phone, a cellular phone, a handheld device, a computing device, a computer, a personal computer (PC), a server computer, a client/server system, a mobile computer, a portable computer, a laptop computer, a notebook computer, a tablet computer, a network of multiple inter-connected devices, or the like. Device 110 may include, for example, a processor 111, an input unit 112, an output unit 113, a memory unit 114, a storage unit 115, and a communication unit 116. Device 110 may optionally include other suitable hardware components and/or software components.

Processor 111 includes, for example, a central processing unit (CPU), a digital signal processor (DSP), one or more processor cores, a single-core processor, a dual-core processor, a multiple-core processor, a microprocessor, a host processor, an ARM architecture processor, a controller, a plurality of processors or controllers, a chip, a microchip, one or more circuits, circuitry, a logic unit, an integrated circuit (IC), an application-specific integrated circuit (ASIC), a field-programmable gate array (FPGA), or any other suitable multipurpose or specific processor or controller. Processor 111 executes instructions, for example, of an operating system (OS) 117 of device 110 and/or of one or more applications 118.

Input unit 112 includes, for example, a keyboard, a keypad, a mouse, a touch-pad, a track-ball, a stylus, a microphone, a camera, or other suitable pointing device or input device. Output unit 113 includes, for example, a monitor, a screen, a cathode ray tube (CRT) display unit, a liquid crystal display (LCD) display unit, a plasma display unit, one or more audio speakers, television displays, or other suitable output devices.

Memory unit 114 includes, for example, a random access memory (RAM), a read only memory (ROM), a dynamic random access memory (DRAM), a synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115, for example, store data processed by device 110.

Communication unit 116 may be or may include, for example, a wireless radio frequency (RF) transceiver able to transmit and/or receive wireless RF signals, blocks, frames, transmission streams, packets, messages and/or data, e.g., through one or more antennas 119 and using wireless communication link 120. Communication unit 116 may be implemented using a transmitter, a receiver, a transceiver, a transmitter-receiver, or other suitable component able to perform separate or integrated functions of transmitting and/or receiving wireless communication signals, blocks, frames, transmission streams, packets, messages and/or data.

Antennas 119 may be implemented using a common antenna, a common set of multiple antennas, or other suitable component. For example, antennas 119 may include an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data. Multiple antennas 119 may correspond, respectively, to multiple channels of wireless link 120. In some embodiments, antennas 119 may be implemented using a smart antenna, an adaptive antenna, a configurable antenna, or other antenna suitable for MIMO and/or beamforming communication. Furthermore, the associated RF components may operate at a range of carrier frequencies including MHz, GHz, THz, or higher.

In some embodiments, communication unit 116 may include one or more modules suitable for a very high throughput MIMO-OFDMA modulation scheme, e.g., a signal-to-noise ratio (SNR) calculator 163, a resource allocator 164, a frequency channel selector 165, a MIMO rank selector 166, a user selector 167, a MIMO coder 168, an antenna configurer 169, or the like. Modules 163-169 may be implemented using any suitable combination of memory, hardwired logic, and/or general-purpose or special-purpose processors, and may be implemented as separate entities, as subsystems of a media access controller (MAC) 161, and/or as subsystems of a physical layer (PHY) 162.

Some embodiments include a system, method, device, protocol and/or mechanism that allows optimal use of space-frequency resources in a very wideband system with many antennas. Some embodiments provide optimal PHY/MAC architectures suitable for future wireless systems such as, for example, very high rate MIMO-OFDM systems having data rates that are 2, 10, or even 100 times faster than conventional rates. Peak wireless data rates under fixed power constraints are examined herein, and suitable mode adaptation algorithms are described for high and for low signal-to-noise ratio (SNR). In addition, the architectures and algorithms described herein may also apply in part to systems that have power constraints imposed on the power spectral density (PSD), rather than on the peak transmit power. In general, a PSD limited system may enjoy higher data rates with increasing frequency bandwidth.

Some embodiments include applying OFDMA to wideband systems, and/or include using low-rank wideband MIMO channels at low SNR, for example, by mode-switching and/or reconfiguring the antennas (e.g., controlled by MAC 161, PHY 162, and/or by antenna configurer 169) in response to the SNR (e.g., calculated by the SNR calculator 163). In some embodiments, instead of allocating full bandwidth at cell edge to a single user, OFDMA signaling may be used to accommodate more users at cell edge. Such an allocation (e.g., performed by the resource allocator 164 and/or by MAC 161) may be a more efficient use of space-frequency resources under fixed power constraints, as demonstrated herein.

Some embodiments provide a single optimal MIMO-OFDMA system that can provide very high rates at short range and connectivity at very long range. For example, some embodiments include inducing long-range beamforming for a wideband system at any carrier frequency.

Some embodiments may be used, for example, in very high rate next-generation standards such as IEEE 802.11 Very High Throughput LAN, future IEEE 802.15 and UWB systems, IEEE WiMax 802.16, 3 G LTE, 4 G, and the like. Embodiments may provide an OFDMA-like multiple-access method for very wideband systems, including, for example, superposition coding and/or superposition MAC of few strong wideband users with many weak narrowband users (e.g., by the MIMO coder 168, OFDMA PHY 162, and/or MAC 161); resource allocation of cell-edge users based on narrowband, low rank MIMO channels (e.g., by the resource allocator 164, channel selector 165, and/or rank selector 166); and/or configuration of antennas into low rank MIMO channels at low SNRs and into high rank MIMO channels at high SNRs (e.g., by the antenna configurer 169 and/or by the rank selector 166).

In some embodiments, communication unit 116 may operate under fixed power constraints, for example, due to regulatory requirements concerning output transmission power. For example, assuming AWGN channels with no fading, shadowing, or practical impairments, the following Shannon channel capacity analysis for very wideband MIMO systems may apply, although embodiments are not limited in this respect.

$$\text{General Shannon capacity } C = B\log\left(\det\left[I_M + \frac{P}{N_oB}HKH^*\right]\right) \quad (1)$$

B=signal bandwidth (Hz)
M=no. antennas (transmit=receive)
P=transmit power (Watts)
$N_o$=noise density (Watts/Hz)
H=M×M MIMO channel, assume AWGN over all bandwidth
K=transmit covariance matrix Equation 1, above, describes the general channel capacity, denoted C, as a function of the signal bandwidth B, number of antennas M, transmit power P, and noise density $N_o$, with an M-by-M channel matrix H and a corresponding transmit covariance matrix K. The following equations describe a theoretical limit to the channel capacity C as the bandwidth B is increased towards infinity and the transmit power P remains fixed. The reference to "rank" throughout this application implies rank of the channel matrix H, e.g., as defined in traditional linear algebra, where it refers to the number of linearly independent rows or columns depending on the matrix dimensions. Equations 2, 3 and 4 correspond to different transmit scenarios, namely, a full rank (M) channel matrix, a rank 1 channel matrix with closed loop ("closed loop" as used herein means there is full knowledge of the channel matrix at the transmitter), and a rank 1 channel with open loop ("open loop" as used herein means there is no channel knowledge at the transmitter).

CASE *I*: Rank *M* channel $$H = \begin{bmatrix} 1 & \cdots & 0 \\ \vdots & \ddots & \vdots \\ 0 & \cdots & 1 \end{bmatrix}$$

$$\text{Optimal } K = 1\Big/M \begin{bmatrix} 1 & \cdots & 0 \\ \vdots & \ddots & \vdots \\ 0 & \cdots & 1 \end{bmatrix} \Rightarrow C = BM\log\left(1 + \frac{P}{N_oBM}\right) \quad (2)$$

$$\lim_{B\to\infty} C = P/N_o \quad (2.1)$$

CASE *II*: Rank 1 channel $$H = \frac{1}{\sqrt{M}}\begin{bmatrix} 1 & \cdots & 1 \\ \vdots & \ddots & \vdots \\ 1 & \cdots & 1 \end{bmatrix} \quad (3)$$

Optimal closed-loop $K =$ $$\frac{1}{M}\begin{bmatrix} 1 & \cdots & 1 \\ \vdots & \ddots & \vdots \\ 1 & \cdots & 1 \end{bmatrix} \Rightarrow C = B\log\left(1 + M\frac{P}{N_oB}\right)$$

$$\lim_{B\to\infty} C = M\frac{P}{N_o} \quad (3.1)$$

$$\text{Suboptimal open-loop } K = \frac{1}{M}\begin{bmatrix} 1 & \cdots & 1 \\ \vdots & \ddots & \vdots \\ 1 & \cdots & 1 \end{bmatrix} \Rightarrow C = B\log\left(1 + \frac{P}{N_oB}\right) \quad (4)$$

$$\lim_{B\to\infty} C = \frac{P}{N_o} \quad (4.1)$$

Accordingly, as demonstrated by Equations 2.1, 3.1, and 4.1 above, for a fixed transmit power P, as bandwidth increases, channel capacity plateaus out to a constant proportional to the SNR. For full rank MIMO channels, this constant is independent of the number of antennas, as demonstrated by Equation 2.1. However for rank 1 MIMO channels with beamforming, this constant is proportional to number of antennas, as demonstrated by Equation 3.1. Equation 4.1 demonstrates that for rank 1 MIMO channels with open loop transmission, the capacity is again independent of the number of antennas M. These results are demonstrated for a range of bandwidths, antennas and SNRs in FIGS. 2 and 3.

The asymptotic effects described by the Equations are observed at very wide bandwidths or, equivalently, at low SNRs. They indicate that channel capacity saturates or plateaus at very high bandwidths, that is, that allocating more bandwidth may not result in any increase in capacity beyond some point (depending on the SNR, number of antennas, channel matrix). Thus, narrow bands may be as good as wider bands at low SNR.

Furthermore, the asymptotic effects indicate that low rank MIMO channels may be preferable to full rank MIMO channels at low SNR. This observation may be counter-intuitive to an average engineer practicing the art conventionally, as full rank MIMO channels are generally believed to be optimal at all SNRs by a majority of the industry.

Figure 2A:
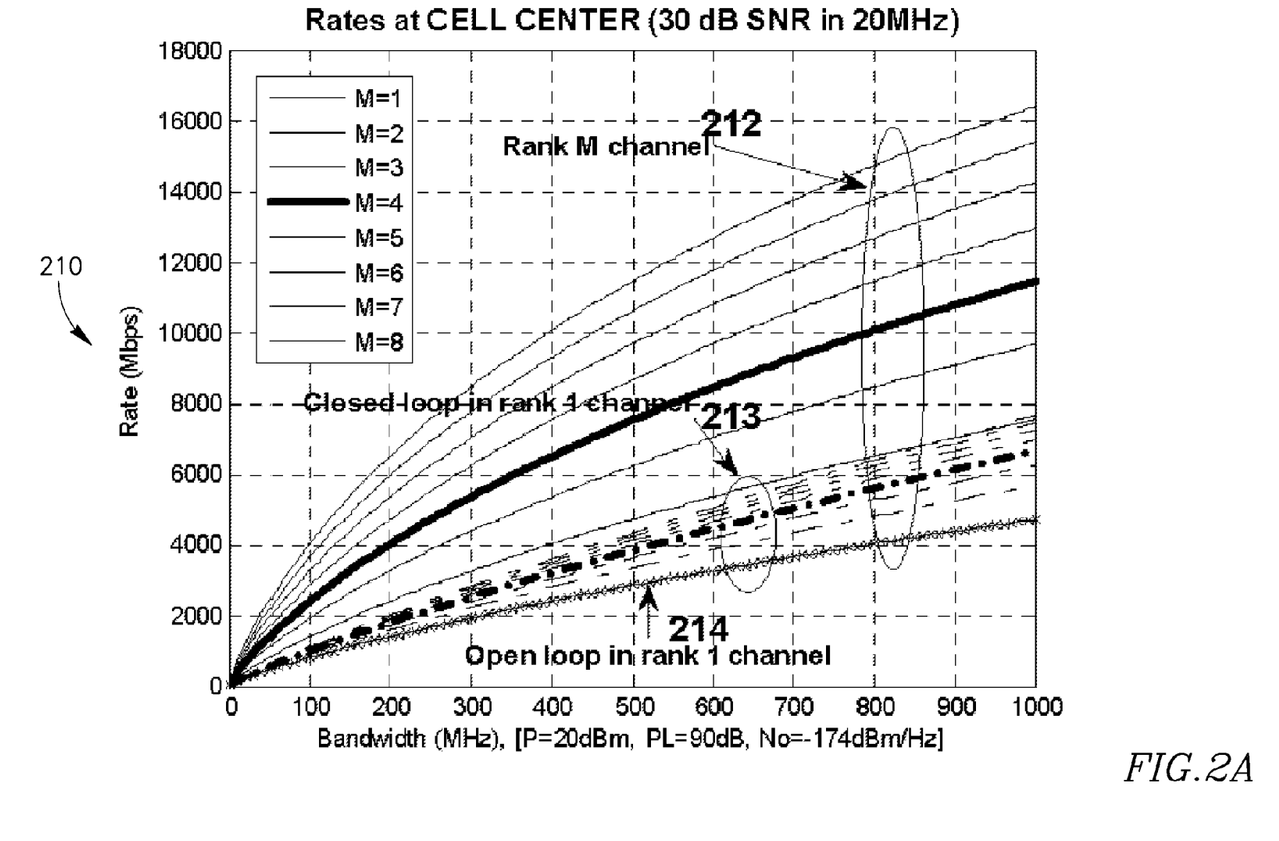
FIGS. 2A, 2B and 2C are schematic illustrations of multiple graphs representing some performance aspects of a wireless communication device under different scenarios in accordance with a demonstrative embodiment of the invention.
Figure 2B:
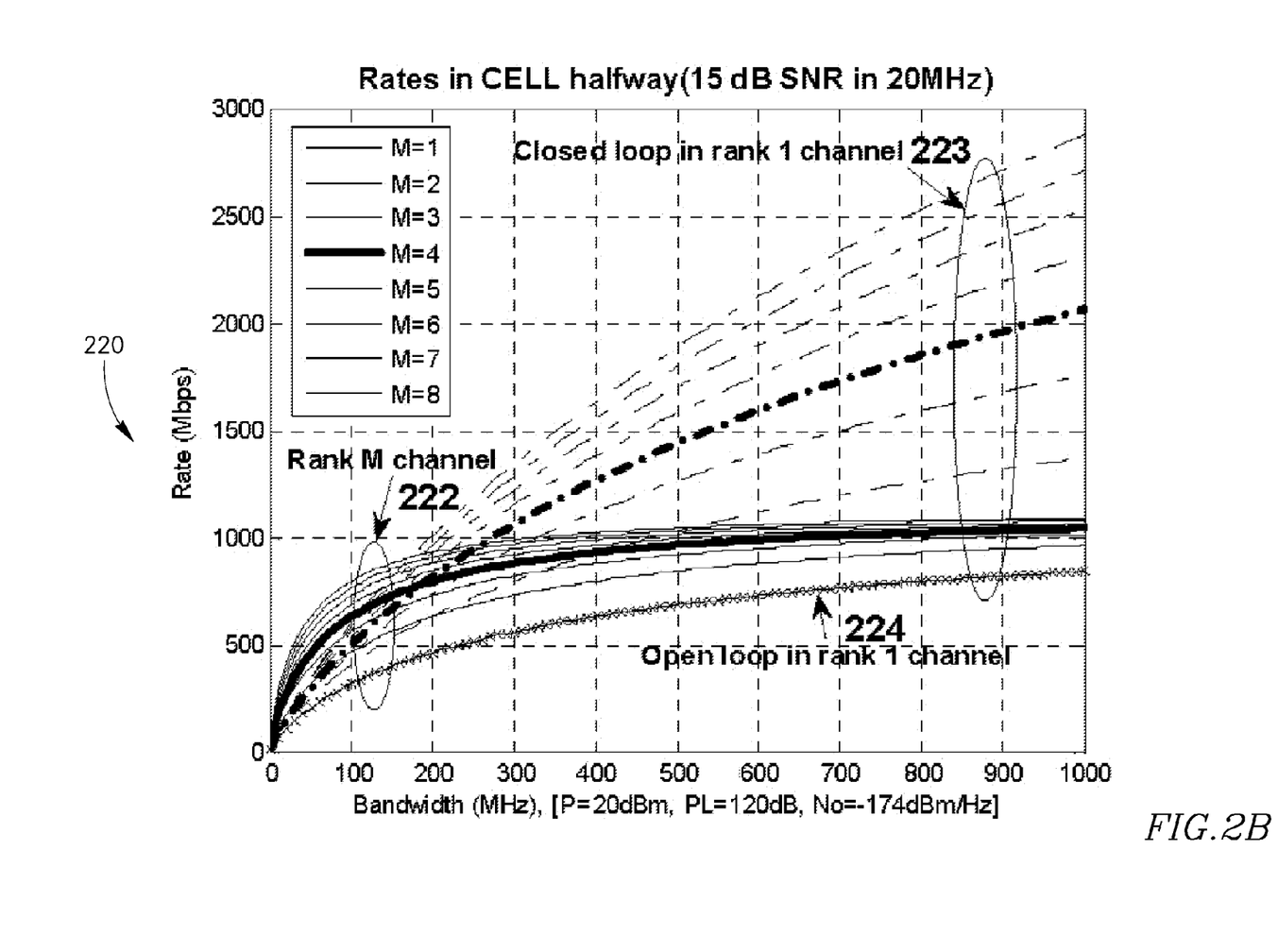
Figure 2C:
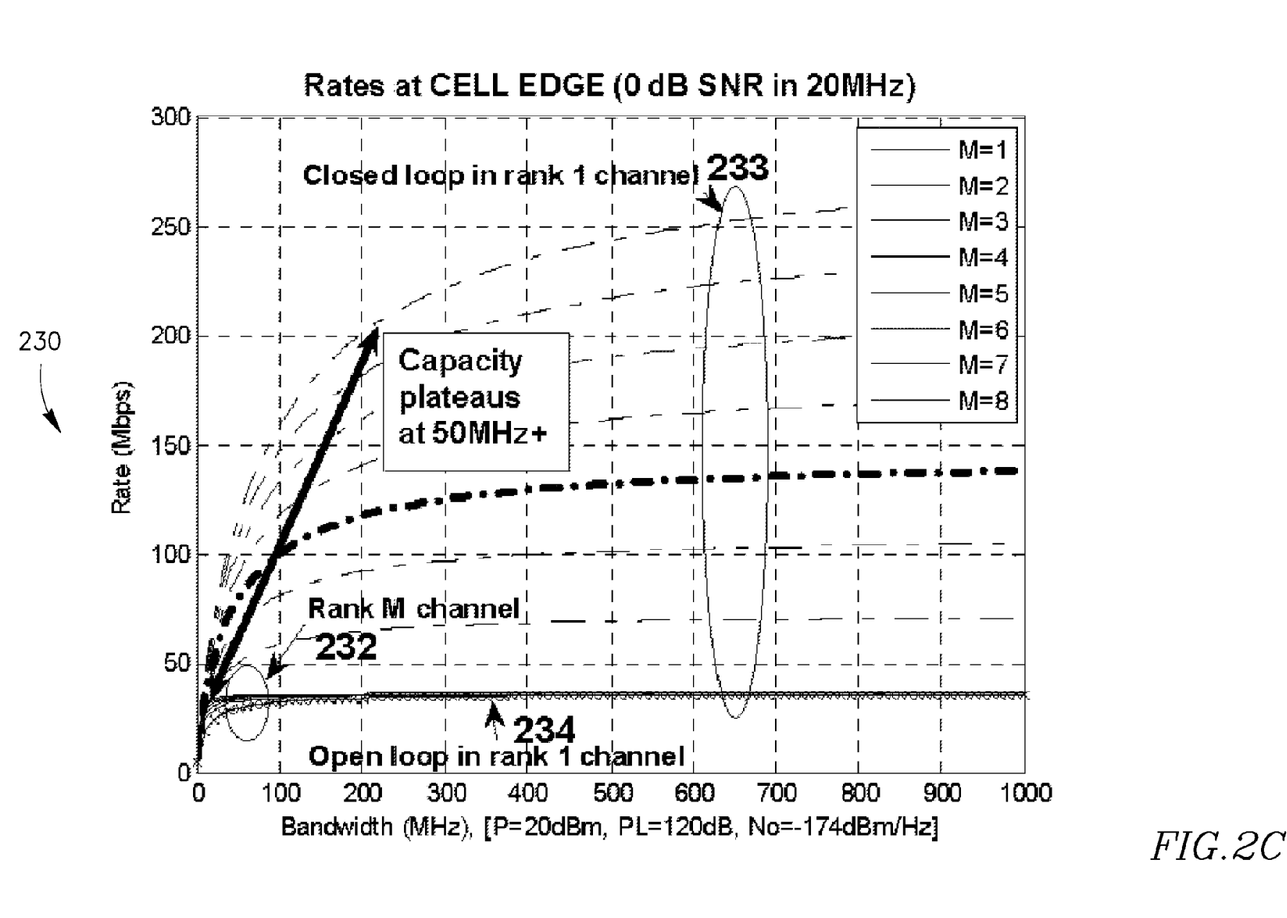

FIGS. 2A, 2B and 2C schematically illustrate multiple graphs 210, 220, and 230 representing some performance aspects of a wireless communication device, e.g., device 110 of FIG. 1, under different communication scenarios in accordance with some demonstrative embodiments of the invention. Graphs 210, 220, and 230 are presented for demonstrative purposes, with values based on Equations 1-4 above, and some embodiments may result in other graphs and/or values.

In each of graphs 210, 220, and 230, the horizontal axis represents bandwidth in MHz, assuming values of total transmit power "P"=20 dBm, path loss between transmitter and receiver due to propagation "PL"=90 dB, and noise power spectral density at the receiver "No"=−174 dBm/Hz. In each of graphs 210, 220, and 230, the vertical axis represents data rate in Mbps.

Graph 210 represents data rates as a function of bandwidth as experienced at cell center, for example, with a high SNR of, e.g., 30 dB in 20 MHz. Solid lines 212 represent a scenario corresponding to Equation 2, with a full rank M channel for different possible values of the number of antennas M. Dashed lines 213 represent a scenario corresponding to Equation 3, with beamforming in a closed loop rank 1 channel for different possible values of the number of antennas M. Thick line 214 marked with "x"-s represents a scenario corresponding to Equation 4, with open loop in a rank 1 channel.

As demonstrated in graph 210, at high SNR, rates are fairly linear in bandwidth for all three transmit scenarios. In addition, as demonstrated in graph 210, full rank channels may have a greater capacity than low rank channels at high SNR.

Graph 220 represents data rates as a function of bandwidth as experienced at cell halfway, for example, with a medium SNR of, e.g., 15 dB in 20 MHz. Solid lines 222 represent a scenario corresponding to Equation 2, with a full rank M channel for different possible values of the number of antennas M. Dashed lines 223 represent a scenario corresponding to Equation 3, with beamforming in a closed loop rank 1 channel for different possible values of the number of antennas M Thick line 224 marked with "x"-s represents a scenario corresponding to Equation 4, with open loop in a rank 1 channel.

As demonstrated in graph 220, at medium SNR, rates are not always linear in bandwidth. For example, in the full rank scenario, represented by solid lines 222, data rate capacity plateaus as bandwidth increases; whereas in the low rank scenario with beamforming, represented by dashed lines 223, capacity continues to increase fairly linearly with the bandwidth. Accordingly, at wider bandwidths, when SNR is decreased, then low rank channels may be more efficient than full rank channels.

Graph 230 represents data rates as a function of bandwidth as experienced at cell edge, for example, with a low SNR of, e.g., 0 (zero) dB in 20 MHz. Solid lines 232 represent a scenario corresponding to Equation 2, with a full rank M channel for different possible values of the number of antennas M. Dashed lines 233 represent a scenario corresponding to Equation 3, with beamforming in a closed loop rank 1 channel for different possible values of the number of antennas M. Thick line 234 marked with "x"-s represents a scenario corresponding to Equation 4, with open loop in a rank 1 channel.

As demonstrated in graph 230, at low SNR, rates plateau with bandwidth. For example, after about 50 MHz of bandwidth, there is no significant increase in capacity (data rate) as bandwidth is increased. In addition, as demonstrated in graph 230, low rank channels with beamforming (lines 233) may have greater capacity than full rank channels (lines 232) at low SNR.

Figure 3:
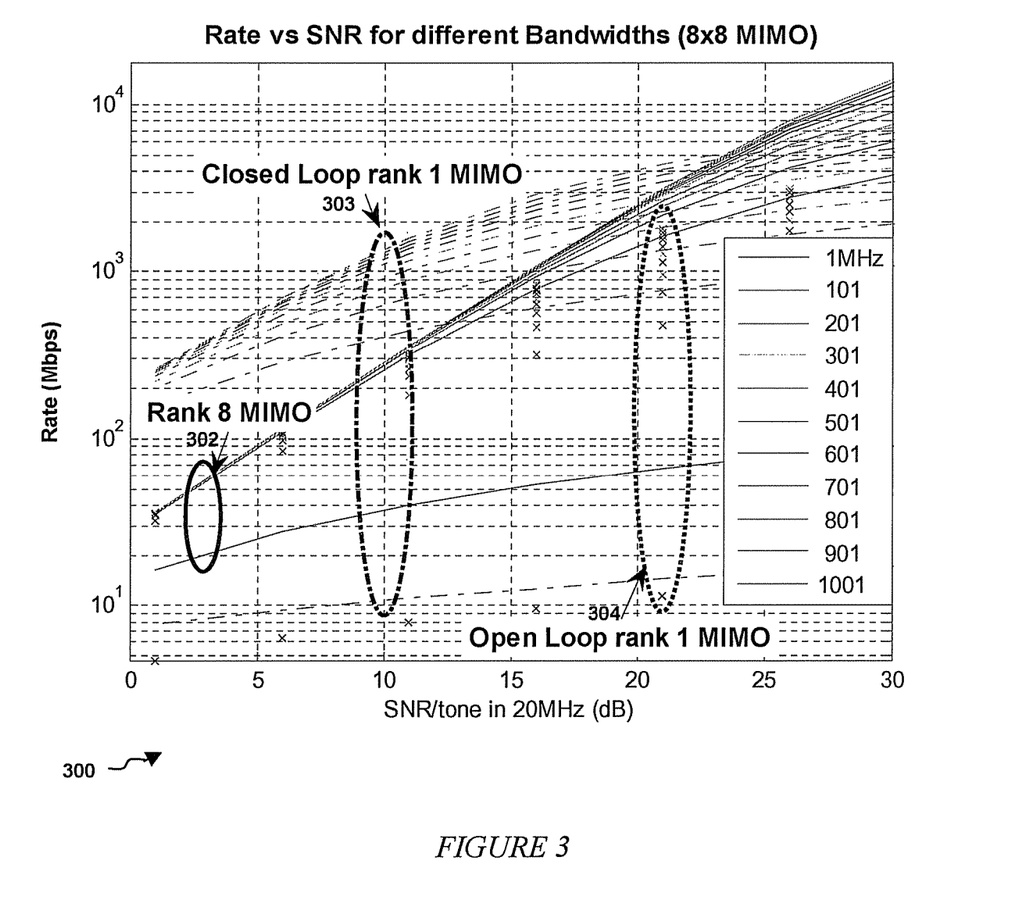
FIG. 3 is a schematic illustration of a graph representing some other performance aspects of a wireless communication device under different scenarios in accordance with a demonstrative embodiment of the invention.

FIG. 3 schematically illustrates a graph 300 representing some other performance aspects of a wireless communication device, e.g., device 110 of FIG. 1, under different communication scenarios in accordance with some demonstrative embodiments of the invention. Graph 300 is presented for demonstrative purposes, with values based on Equations 1-4 above, and some embodiments may result in other graphs and/or values.

In graph 300, the horizontal axis represents SNR per tone in 20 MHz, measured in units of dB, and the vertical axis represents data rate in units of Mbps. Graph 300 represents data rate as a function SNR for different bandwidths in an 8×8 MIMO communication scheme. Solid lines 302 represent the scenario of Equation 2, with a full rank 8 channel for different possible bandwidths, e.g., ranging from 1 MHz to 1 GHz. Dashed lines 303 represent the scenario of Equation 3, with beamforming in a closed loop rank 1 channel for different possible bandwidths. Data points 304, marked with "x"-s, represent the scenario of Equation 4, with open loop in a rank 1 channel for different possible bandwidths.

As demonstrated in graph 300, at wider bandwidths, low rank MIMO channels may perform better. For example, consider the line corresponding to a bandwidth of 1 MHz, which is the bottom-most line in each of the three graphed scenarios: (a) rank 8 MIMO (set 302) (b) closed loop rank 1 MIMO (set 303), and (c) open loop rank 1 MIMO (set 304). At this bandwidth, the capacities are ordered as (a)>(b)>(c), that is, rank M channels are best. If we consider a bandwidth of 1.001 GHz, which is represented by the top-most line in each of the sets 302 (a), 303 (b), and 304 (c), then capacities are indeed ordered as (a)>(b)>(c) at high SNRs. However, as shown in graph 300, at SNRs below 23 dB, capacities are ordered differently as (b)>(a)>(c), which means closed-loop rank 1 channels are best at low SNRs.

For demonstrative purposes, the schematic graphs in FIGS. 2 and 3 illustrate bandwidths ranging from 1 MHz-1 GHz over a common range of SNR per tone (0-30 dB) measured in 20 MHz. The actual SNR per tone may depend on the bandwidth; for example, in some embodiments the SNR may be 20 times higher in 1 MHz and/or 50 times lower in 1 GHz compared to the horizontal axis labels. Accordingly, some embodiments include a single optimal MIMO-OFDMA system that may provide very high rates at short range and connectivity at very long range. Thus, some embodiments may be suitable for high rate systems that may maintain a range equal to or greater than the range typically used in conventional systems.

Referring again to FIG. 1, some very high rate systems, e.g., system 100 of FIG. 1, require a large portion of the spectrum, for example, on the order of 100 MHz-1 GHz. Focusing on spectrally efficient techniques that can maximize the number of users per unit of spectrum, some embodiments perform resource allocation of such wide spectrum portion among users for optimal performance. In some embodiments, a wireless communication device such as device 110 and/or communication unit 116 may implement optimal space-frequency architectures and/or methods for very high peak rates in wireless systems, e.g., based on the analysis presented herein. Resource allocation may be optimized according to at least one of signal-to-noise ratio (SNR), bandwidth, number of users, and signal-to-noise-plus-interference ratio (SINR).

For example, in some embodiments, it may be sufficient to allocate narrow bands per user at cell edge as compared to the wide bands required for high peak rate at cell center. Narrow bands may also allow higher cell-edge user density per access point or base station. Sharing spectrum among multiple users leads to an OFDMA (orthogonal frequency division multiplexing multiple-access) PHY-MAC, rather than the OFDM (orthogonal frequency division multiplexing) PHY currently popular in conventional IEEE 802.11 LAN and IEEE 802.15 PAN.

Accordingly, in some embodiments, MAC 161 and PHY 162 may be implemented with OFDMA PHY-MAC architecture. The OFDMA scheme is a core part of IEEE 802.16 WiMax, where it provides multi-user scheduling diversity over relatively narrowband channels. Wideband systems such as system 100, in contrast, may already have sufficient diversity due to multipath, and are more pathloss-limited than fading-limited. Some embodiments thus apply OFDMA to such power-limited systems, e.g., to system 100.

Figure 4:
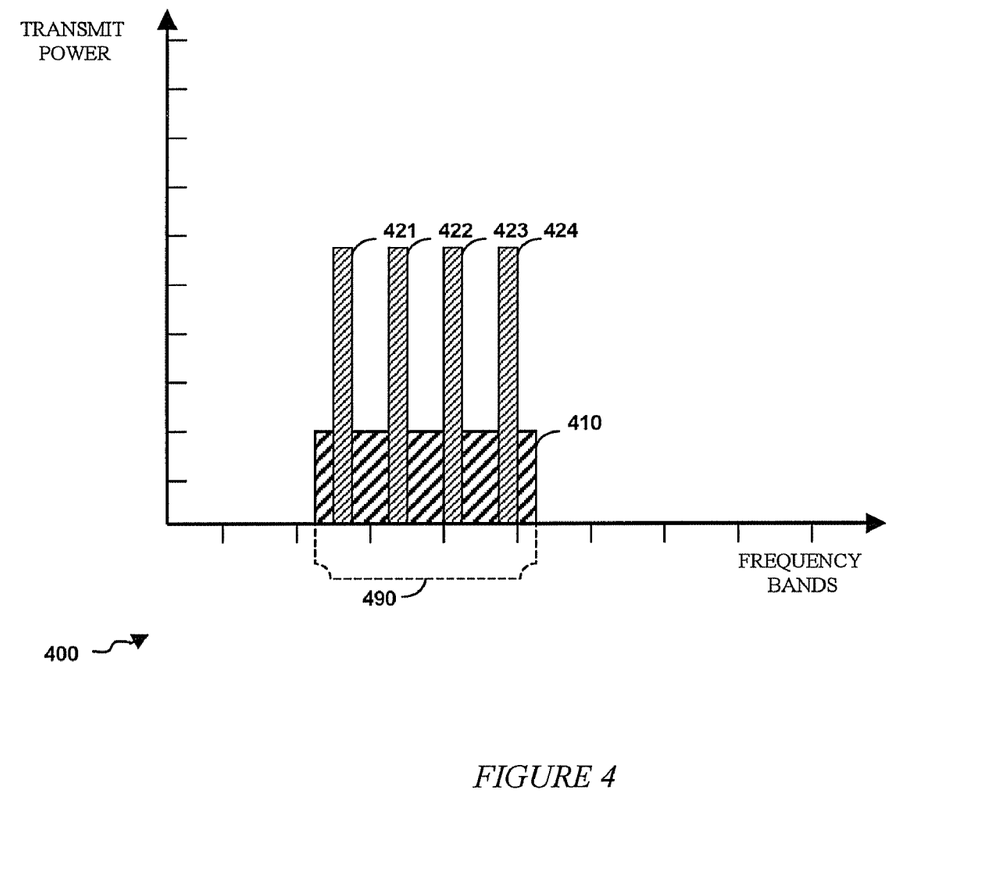
FIG. 4 is a schematic illustration of a resource allocation scheme in accordance with some embodiments of the invention

FIG. 4 schematically illustrates a resource allocation scheme in accordance with some embodiments of the invention. In some embodiments, a method may include allocation of the same wideband channel to a few strong users and many weak users with simultaneous transmission, for example, by implementing a superposed MAC, e.g., MAC 161. Note that the superposed MAC may be an optimal resource allocation scheme for near-far users served by the same AP, assuming successive multi-user decoding (or maximum likelihood decoding) at the AP.

As shown in FIG. 4, by using superposition the same wideband channel, e.g., at frequency range 490, may be allocated to a wideband user 410 and also allocated to multiple narrowband users 421-424. User 410 may be a nearby user of a particular base station or access point, and users 421-424 may be far users of the same base station or access point, to be jointly decoded.

In some embodiments, the definition of narrowband for cell-edge users may be extended to include more general resources. For example, interference management schemes may require spreading cell-edge users over wide bands in conjunction with better interference coding.

In some embodiments, device 110 may include many transmit and receive antennas 119, e.g., to compensate for a possible lack of available spectrum for very high rate systems. As demonstrated above with reference to FIGS. 2 and 3, full rank MIMO channels are optimal at high SNRs, yet low rank MIMO channels with beamforming provide better capacity at very low SNRs. This result may be counter-intuitive, since full rank channels are considered optimal for all scenarios in conventional systems. This phenomenon is similar to time-domain "bursty signaling" which is optimal for pulse based UWB systems with time-domain detectors. Intuitively, in power-limited systems such as system 100, it may be more efficient to transmit a localized burst of power in the detection dimension (e.g. time, frequency, space).

In some embodiments, a method may include inducing low rank channels at low SNRs and high rank channels at high SNRs. For example, assuming arbitrary fading channel realizations (which result in arbitrary rank), the channel rank can be controlled to some extent by (1) using reconfigurable antennas (e.g., controlled by the antenna configurer 169 and/or by the PHY 162) to vary antenna gains to induce the desired MIMO channels and/or by (2) assigning users (e.g., controlled by the user selector 167 and/or by MAC 161) to select OFDMA tones or bands that provide desired MIMO channels per user.

In some embodiments, a method may include optimizing the total capacity per user, e.g., according to Equation 1. For example, in some cases high rank channels may outdo low rank channels even at low SNR if their total energy transfer is higher (channel power in Equations 2 and 3 is normalized for fairness).

In some embodiments, a method may include inducing long-range beamforming for any wideband system at any carrier frequency. For example, while the 60 GHz PAN standard relies upon beamforming to compensate for very high pathloss at the 60 GHz carrier frequency, Equations 24 herein are general and apply to any carrier, for example 5 GHz or lower, 50 GHz, 60 GHz, and 1 THz or higher. As demonstrated herein, inducing long-range beamforming may provide optimal resource allocation for power-limited wideband systems.

Although the analysis herein is based on simple AWGN channels, some embodiments may include systems with multipath channels. For example, since frequency diversity generally saturates beyond 100 MHz, frequency selectivity in 100 MHz should be representative of the entire band, and thus similar results as those presented herein may be valid for multipath channels. Interference from other wireless devices, access points, base stations, and/or users, e.g., from devices 191-194, may effectively raise the noise level and may force assignation of cell-edge like resources even to cell-center users that suffer heavy interference, depending on shadowing. Issues such as dynamic range, frequency range, and power consumption of RF front ends and digital filters have not been considered here.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

In some embodiments, the method described herein may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, for example, an application-specific integrated circuit (ASIC) or a field-programmable gate array (FPGA), or by any combination of programmed computer components and custom hardware components. Various general-purpose systems may be used with programs in accordance with the teachings herein, or it may prove convenient to construct a more specialized apparatus to perform the method.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus for wireless communication in a power-limited, very wideband system, the apparatus comprising:
   a wireless communication device having a media access controller (MAC) and a physical layer (PHY) that are adapted for a multiple-input-multiple-output (MIMO) orthogonal frequency-division multiple access (OFDMA) communication scheme in a power-limited wideband system;
   a plurality of antennas, operationally coupled to said device, to send and receive wireless communication signals according to said MIMO-OFDMA communication scheme; and
   a resource allocator, to allocate transmission resources of said device into desired MIMO channels optimized according to at least one of signal-to-noise ratio (SNR), bandwidth, number of users, and signal-to-noise-plus-interference ratio (SINR), wherein said desired MIMO channels are optimized according to SNR, to include low rank MIMO channels at low SNR and to include high rank MIMO channels at high SNR.

2. The apparatus of claim 1, wherein said resource allocator is to allocate cell-edge users to narrowband, low-rank MIMO channels.

3. The apparatus of claim 1, wherein said resource allocator is adapted to induce long-range beamforming for a wideband system at any of a plurality of carrier frequencies.

4. The apparatus of claim 1, wherein said resource allocator includes an antenna configurer to reconfigure said plurality of antennas into said desired MIMO channels optimized according to at least one of signal-to-noise ratio (SNR), bandwidth, number of users, and signal-to-noise-plus-interference ratio (SINR).

5. The apparatus of claim 4, wherein said antenna configurer is adapted to vary the antenna gains to induce the desired MIMO channels.

6. The apparatus of claim 5, wherein said resource allocator is adapted to assign users to select OFDMA tones that provide said desired MIMO channels.

7. An apparatus for wireless communication in a power-limited, very wideband system, the apparatus comprising:
   a wireless communication device having a media access controller (MAC) and a physical layer (PHY) that are adapted for a multiple-input-multiple-output (MIMO) orthogonal frequency-division multiple access (OFDMA) communication scheme in a power-limited wideband system;
   a plurality of antennas, operationally coupled to said device, to send and receive wireless communication signals according to said MIMO-OFDMA communication scheme; and
   a resource allocator, to allocate transmission resources of said device into desired MIMO channels optimized according to at least one of signal-to-noise ratio (SNR), bandwidth, number of users, and signal-to-noise-plus-interference ratio (SINR), wherein said resource allocator includes a superposition coder to allocate a wideband channel to a small number of strong wideband users together with a greater number of weak narrowband users.

8. The apparatus of claim 7, wherein said resource allocator is to allocate cell-edge users to narrowband, low-rank MIMO channels.

9. The apparatus of claim 7, wherein said resource allocator is adapted to induce long-range beamforming for a wideband system at any of a plurality of carrier frequencies.

10. The apparatus of claim 7, wherein said resource allocator is adapted to assign users to select OFDMA tones that provide said desired MIMO channels.

11. The apparatus of claim 7, wherein said desired MIMO channels are optimized according to SNR, to include low rank MIMO channels at low SNR and to include high rank MIMO channels at high SNR.

12. The apparatus of claim 7, wherein said resource allocator includes an antenna configurer to reconfigure said plurality of antennas into said desired MIMO channels optimized according to at least one of signal-to-noise ratio (SNR), bandwidth, number of users, and signal-to-noise-plus-interference ratio (SINR).

13. The apparatus of claim 12, wherein said antenna configurer is adapted to vary the antenna gains to induce the desired MIMO channels.

14. A method for wireless communication in a power-limited, very wideband system, the method comprising:
   communicating wireless signals via a device having a media access controller (MAC) and a physical layer (PHY) that are adapted for a multiple-input-multiple-output (MIMO) orthogonal frequency-division multiple access (OFDMA) communication scheme in a power-limited wideband system; and
   allocating transmission resources of said device into desired MIMO channels optimized according to at least one of signal-to-noise ratio (SNR), bandwidth, number of users, and signal-to-noise-plus-interference ratio (SINR), the allocating including allocating a wideband channel to a small number of strong wideband users together with a greater number of weak narrowband users by superposition coding.

15. The method of claim 14, comprising:
   optimizing said desired MIMO channels according to SNR, to include low rank MIMO channels at low SNR and to include high rank MIMO channels at high SNR.

16. The method of claim 14, wherein allocating transmission resources of said device comprises:
   reconfiguring a plurality of antennas, operationally coupled to said device, into the desired MIMO channels optimized according to at least one of signal-to-noise ratio (SNR), bandwidth, number of users, and signal-to-noise-plus-interference ratio (SINR).

17. The method of claim 14, wherein allocating transmission resources of said device comprises:

assigning users to select OFDMA tones that provide the desired MIMO channels.

18. The method of claim 14, wherein allocating transmission resources of said device comprises:
allocating cell-edge users to narrowband, low-rank MIMO channels.

19. The method of claim 14, wherein allocating transmission resources of said device comprises:
inducing long-range beamforming for a wideband system at any of a plurality of carrier frequencies.

* * * * *